Patented Dec. 4, 1951

2,577,505

UNITED STATES PATENT OFFICE 2,577,505

PREPARATION OF DI-TERTIARY BUTYL QUINONE

Gerald R. Barrett, Winchester, Mass., assignor to Monsanto Chemical Company, St. Louis, Mo., a corporation of Delaware No Drawing. Application July 1, 1950, Serial No. 171,763

9 Claims. (Cl. 260—396)

This invention relates to the preparation of 2,5 di-tertiary butyl quinone, and particularly to its preparation from the corresponding hydroquinone by oxidation with nitric acid.

It is a primary object of this invention to provide a novel and economical process for the preparation of 2,5 di-tertiary butyl quinone in high yields.

Further objects and advantages of the invention will become apparent from the following detailed description and appended claims.

The process is carried out in general by oxidizing di-tertiary butyl hydroquinone with nitric acid in the presence of a solvent medium. This is preferably accomplished by first dissolving the di-tertiary butyl hydroquinone in a suitable water-miscible organic solvent, such as, for example, formic acid, acetic acid, propionic acid, ethanol, isopropanol, tertiary butyl alcohol, acetone, dioxane and the like. The solvent mixture is preferably heated to the boiling point, or nearly to the boiling point to facilitate solution and reduce the amount of solvent required. Nitric acid is then added in an amount sufficient to produce substantially complete oxidation of the hydroquinone, while maintaining the temperature at or just below the boiling point. After adding all of the nitric acid, the reaction is usually substantially complete, and the reaction mixture is then cooled to crystallize out the reaction product. The product is then removed from the reaction mass by filtering, and is washed to remove residual solvent and nitric acid, and then dried.

It is generally desirable to add further quantities of water at the time of cooling, or at some stage after the nitric acid is added, in order to promote the complete separation of crystals. Moreover, when the reaction is carried out at the boiling point, it is preferably to do so under reflux in order to avoid loss of solvent.

A more complete understanding of the invention will be obtained from the following examples:

Example I

Seventy-three and a half pounds of 91% isopropanol were first charged to a Pfaudler mixer provided with a paddle stirrer and reflux condenser. To the isopropanol so charged was added 18 pounds of 2,5 di-tertiary butyl hydroquinone, while stirring. While the hydroquinone was being added the mixture was heated up to 75 to 80° C. Twenty-six and eight tenths pounds of 42° Bé. nitric acid were then added to the resulting solution over a period of one hour. During the addition of the acid, external heating was discontinued, and the temperature of the mass fell, but only to about 65° C. owing to the heat of reaction. After all the acid was added, the temperature of the mass was maintained at 60 to 65° C. for about 30 minutes to complete the reaction. The reaction mass was then cooled down to about 25° C., and the resulting slurry was filtered on a suction filter. The filter cake thus obtained was washed twice with 80% isopropanol, and was dried at 60 to 80° C.

The dry product weighed 16.9 pounds, which represents a 94% yield of 2.5 di-tertiary butyl quinone. It was in the form of moderately coarse orange-yellow needles melting at 153° C.

Example II

Nineteen pounds of 2,5 di-tertiary butyl hydroquinone were first dissolved in 64.5 pounds of 99% isopropanol and 12.3 pounds of water, using a Pfaudler mixer provided with a stirrer and reflux condenser. During the addition of the hydroquinone, the mixture was heated to 84 to 85° C. The steam was then turned off, and 28 pounds of 42° Bé. nitric acid were added over a period of 30 minutes. By the end of the acid addition, the temperature dropped to 76 to 77° C. The reaction was then continued, with stirring, but without the application of heat, until no more gas was evolved, which required about 15 to 30 minutes. Eight and a half pounds of water were added to the reaction mass, which was then cooled down to about 25° C. by cooling the walls of the mixer. The product was then filtered, washed twice with 64% isopropanol, and then dried.

The yield obtained in accordance with the above described process was 97%. The product was in the form of moderately coarse orange-yellow needles which melted at 153° C.

Example III

One hundred and four pounds of glacial acetic acid were charged to a Pfaudler mixer provided with a paddle stirrer and reflux condenser, after which 23 pounds of 2,5 di-tertiary butyl hydroquinone were added with stirring. During the addition of the hydroquinone, the mixture was heated up to 100° C., and was maintained at 100° C. for 10 minutes thereafter to insure complete solution of the hydroquinone. Eight and a quarter pounds of 42° Bé. nitric acid were then slowly added during which time the temperature of the mass gradually dropped. After all the nitric acid was added, the reacting mixture was further cooled down to 30° C. Twenty-four pounds of water were then added, and the cooling was continued until the temperature of the mass reached 25° C. The resulting slurry of crystals was then filtered, and the crystals thus obtained were washed repeatedly with water to remove last traces of acetic and nitric acids, after which the crystals were dried for 6 to 8 hours.

The product obtained as above had a melting point of 153° C., and contained less than 0.1% benzene-insolubles and less than 1% moisture. The yield of product, which was similar in form and melting point to the product of Examples I and II, was 95%.

*Example IV*

Eighteen pounds of 2,5 di-tertiary butyl hydroquinone were dissolved in 68 pounds of acetone maintained at the boiling point in a Pfaudler mixer provided with a reflux condenser. After the hydroquinone had all dissolved, the heating was discontinued, after which 20 pounds of 42° Bé. nitric acid were added slowly at a rate sufficient to maintain gentle reflux. After all of the acid was added, 27 pounds of water were admixed with the reacting mass, and the mixture was then cooled down to about 15° C. with the formation of a slurry of crystals. The resulting slurry was then filtered to separate the crystals contained therein, and the crystals were washed twice with 50% acetone, and finally dried.

The product obtained as described above was in the form of moderately large yellow needles which melted at about 153° C.

In the above examples sufficient nitric acid was added to obtain substantially complete oxidation. If less nitric acid than this is used, undesired intermediate oxidation products are formed. Larger amounts of acid are preferably not used in the interest of economy, but the reaction proceeds as well with the use of excess of acid over that required for complete oxidation. Concentrated nitric acid is preferably used, but the acid may be somewhat diluted, if desired.

Although any water miscible organic solvent of the type described may be employed, acetic acid is the most suitable for large scale operations, in that it is less subject to oxidation by the nitric acid than are certain of the other solvents employed, such as the alcohols.

The product obtained in accordance with the process of this invention, 2,5 di-tertiary butyl quinone, is useful as a retarder in certain polymerization reactions, such as in the copoylmerization of styrene and maleic anhydride.

What is claimed is:

1. The method of preparing 2,5 di-tertiary butyl quinone which comprises dissolving 2,5 di-tertiary butyl hydroquinone in a water-miscible organic solvent, while heating the mixture, adding concentrated nitric acid to the resulting solution in an amount at least sufficient to provide substantially complete oxidation of said hydroquinone, cooling the reaction mass to produce crystals, and separating the crystals from the reaction mass.

2. The method of preparing 2,5 di-tertiary butyl quinone which comprises dissolving 2,5 di-tertiary butyl hydroquinone in a water-miscible organic solvent, while heating the mixture substantially to the boiling point, adding concentrated nitric acid to the resulting solution in an amount at least sufficient to provide substantially complete oxidation of said hydroquinone, cooling the reaction mass to produce crystals, and separating the crystals from the reaction mass.

3. The method of preparing 2,5 di-tertiary butyl quinone which comprises dissolving 2,5 di-tertiary butyl hydroquinone in a water-miscible organic solvent, while heating the mixture substantially to the boiling point, adding concentrated nitric acid to the resulting solution in an amount at least sufficient to provide substantially complete oxidation of said hydroquinone, while maintaining the mixture at substantially the boiling point, cooling the reaction mass to produce crystals, and separating the crystals from the reaction mass.

4. The method of preparing 2,5 di-tertiary butyl quinone which comprises dissolving 2,5 di-tertiary butyl hydroquinone in a water-miscible organic solvent, while heating the mixture substantially to the boiling point, adding concentrated nitric acid to the resulting solution in an amount at least sufficient to provide substantially complete oxidation of said hydroquinone, while maintaining the mixture at substantially the boiling point, adding a quantity of water to the reaction mass and cooling the reaction mass to produce crystals, separating the crystals from the reaction mass, and then washing and drying the crystals.

5. The method as described in claim 3, but further characterized in that the organic solvent used is glacial acetic acid.

6. The method as described in claim 3, but further characterized in that the organic solvent used is isopropanol.

7. The method as described in claim 3, but further characterized in that the organic solvent used is ethanol.

8. The method as described in claim 3, but further characterized in that the organic solvent used is acetone.

9. The method as decsribed in claim 3, but further characterized in that the organic solvent used is dioxane.

GERALD R. BARRETT.

No references cited.